United States Patent
Xiao (10) Patent No.: US 12,530,117 B2
(45) Date of Patent: Jan. 20, 2026

(54) MEMORY CONTROLLERS AND ELECTRONIC APPARATUSES, OPERATION METHODS THEREOF TO EXECUTE A SHUTDOWN PREPARATION OPERATION

(71) Applicant: Yangtze Memory Technologies Co., Ltd., Hubei (CN)

(72) Inventor: Yong Xiao, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/672,914

(22) Filed: May 23, 2024

(65) Prior Publication Data

US 2025/0298508 A1    Sep. 25, 2025

(30) Foreign Application Priority Data

Mar. 25, 2024   (CN) .......................... 202410345880.X (51) Int. Cl.
*G06F 3/06* (2006.01)

(52) U.S. Cl.
CPC .......... *G06F 3/0604* (2013.01); *G06F 3/0634* (2013.01); *G06F 3/0679* (2013.01)

(58) Field of Classification Search
CPC .............................. G06F 3/0634; G06F 3/0679
See application file for complete search history.

(56) References Cited

U.S. PATENT DOCUMENTS

| | | | | |
|---|---|---|---|---|
| 9,035,956 | B1* | 5/2015 | Schreyer | G06F 1/3287 |
| | | | | 345/506 |
| 2013/0173902 | A1* | 7/2013 | Sodhi | G06F 1/3296 |
| | | | | 713/300 |
| 2016/0154745 | A1* | 6/2016 | Nagai | H04L 9/3228 |
| | | | | 713/193 |

* cited by examiner

*Primary Examiner* — Nicholas A. Paperno
(74) *Attorney, Agent, or Firm* — HANLEY, FLIGHT & ZIMMERMAN, LLC (57) ABSTRACT

Examples of the present disclosure provide memory controllers and electronic apparatuses, and operation methods thereof to execute a shutdown preparation operation. In some examples, the shutdown preparation operation analyzes why the memory controller does not respond to commands of a host upon issuance of a shutdown signal. The processor may execute a shutdown preparation operation based on the shutdown signal. The shutdown preparation operation may include stopping running some of processing units in the processor and outputting a response signal by a first processing unit that continues to run in the processor. The response signal is indicates that the processor has executed the shutdown preparation operation. Due to the execution of the shutdown preparation operation, if a command is received, the processor sends the response signal to the host. Accordingly, in some examples, failure analysis based on receipt of the response signal at the host can be conducted.

20 Claims, 5 Drawing Sheets

MEMORY CONTROLLERS AND ELECTRONIC APPARATUSES, OPERATION METHODS THEREOF TO EXECUTE A SHUTDOWN PREPARATION OPERATION

CROSS-REFERENCE TO RELATED APPLICATION

The present application claims the benefit of priority to China Application No. 202410345880.X, filed on Mar. 25, 2024, the content of which is incorporated herein by reference in its entirety.

TECHNICAL FIELD

The present disclosure relates to the field of semiconductor technology, and particularly to memory controllers, operation methods thereof, and electronic apparatuses.

BACKGROUND

A memory system is one of the important components of a computer. The memory system provides the capability to write and read information needed for the computer operation, so as to achieve the information memory function of the computer.

DETAILED DESCRIPTION

In order to make the purposes, technical solutions, and advantages of the present disclosure clearer, the present disclosure will be further described in detail below in conjunction with drawings. The described examples should not be considered as limitations to the present disclosure. All other examples obtained by those of ordinary skills in the art without creative effort fall in the scope of protection of the present disclosure.

In the following description, reference is made to "some examples", which describes a subset of all possible examples. However, it may be understood that "some examples" may be the same subset or a different subset of all possible examples, and may be combined with each other without conflict.

In the following description, the terms "first/second/third" involved are only used to distinguish similar objects, and do not represent a specific ordering of the objects. It may be understood that "first/second/third" can be interchanged for the specific sequence or sequential order when the conditions permit to enable the examples of the present disclosure described herein to be implemented in other sequences than those shown or described herein.

It is to be noted that, the terms "include", "comprise", or any variants thereof herein are intended to cover non-exclusive inclusion, such that a process, a method, an article, or a device comprising a series of elements comprise not only those elements, but also other elements not listed explicitly, or elements inherent to this process, method, article, or device. Without more limitations, an element defined by a statement "comprising one" does not exclude the presence of another identical element in the process, method, article, or device comprising this element.

Unless otherwise defined, all technical and scientific terms used herein have the same meanings as those generally understood by those skilled in the art of the present disclosure. The terms used herein are only intended to describe the purposes of the examples of the present disclosure, instead of limiting the present disclosure.

With the development of cloud computing, online payment, mobile social communication, artificial intelligence, the Internet of Things, and other technologies, the complexity of computer application operations has risen sharply, and failure scenarios have become increasingly complex. When problems occur, how to improve the speed of failure analysis is an urgent issue for those skilled in the art.

Figure 1:
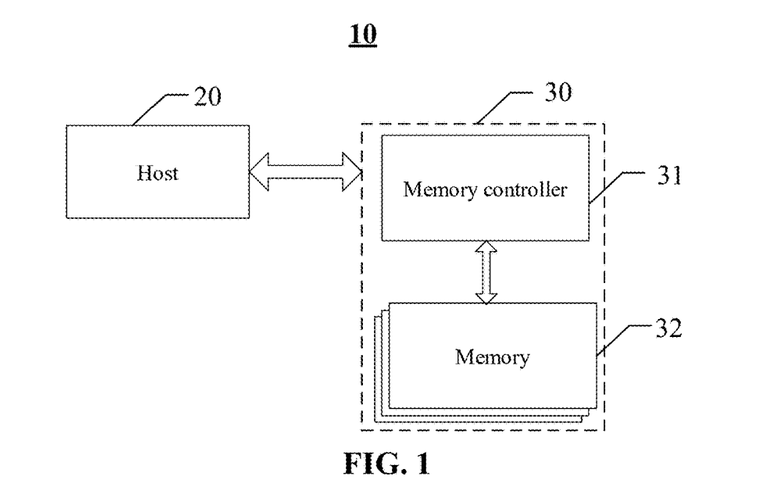
FIG. 1 is a block diagram of an example system comprising a memory provided by examples of the present disclosure.

FIG. 1 is a block diagram of an electronic apparatus provided by examples of the present disclosure. The electronic apparatus 10 may comprise a host 20 and a memory system 30. The electronic apparatus 10 may include, but is not limited to, a mobile phone, a desktop computer, a laptop computer, a tablet computer, a vehicle computer, a game console, a printer, a positioning apparatus, a wearable electronic apparatus, a smart sensor, a virtual reality (VR) apparatus, an augmented reality (AR) apparatus, or any other suitable electronic apparatus having a memory 32. The host 20 may be a processor (e.g., a central processing unit (CPU)) or a system on chip (SoC) (e.g., an application processor (AP)) of the electronic apparatus.

In some examples, the host 20 may be configured to send data to or receive data from the memory system 30. Here, the memory system 30 may comprise a memory controller 31 and one or more memories 32. The memory 32 may include, but is not limited to, a NAND flash memory, a vertical NAND flash memory, a NOR flash memory, a dynamic random access memory (DRAM), a ferroelectric random access memory (FRAM), a magnetoresistive random access memory (MRAM), a phase change random access memory (PCRAM), a resistive random access memory (RRAM), a nano random access memory (NRAM), etc.

In some examples, the memory controller 31 may be coupled to the memory 32 and the host 20, and is configured to control the memory 32. In an example, the memory controller 31 may be designed for operating in a low duty-cycle environment, such as a secure digital (SD) card, a compact flash (CF) card, a universal serial bus (USB) flash drive, or other media for use in electronic apparatuses, such as a personal computer, a digital camera, a mobile phone, etc. In some examples, the memory controller 31 may be also designed for operating in a high duty-cycle environment, such as a solid state disk (SSD) or an embedded multi-media card (eMMC), which may be used as a data memory for mobile apparatuses, such as a smartphone, a tablet computer, and a laptop computer, etc., and an enterprise memory array.

Further, the memory controller 31 may manage the data stored in the memory 32 and communicate with the host 20. The memory controller 31 may be configured to control read, erase, and program operations of the memory 32, may be further configured to manage various functions with respect to data stored or to be stored in the memory 32, including, but not limited to, bad-block management, garbage collection, logical-to-physical address conversion, wear leveling, etc., and may be further configured to process error checking and correction (ECC) codes with respect to the data read from or written to the memory 32. Furthermore, the memory controller 31 may further perform any other suitable functions, e.g., formatting the memory 32 or communicating with an external apparatus (e.g., the host 20 in FIG. 1) according to a particular communication protocol. In an example, the memory controller 31 may communicate with the host 20 through at least one of various interface protocols, such as a USB protocol, an MMC protocol, a Peripheral Component Interconnect (PCI) protocol, a Peripheral Component Interconnect Express (PCI-E) protocol, an Advanced Technology Attachment (ATA) protocol, a serial ATA protocol, a parallel ATA protocol, a Small Computer System Interface (SCSI) protocol, an Enhanced Small Disk Interface (ESDI) protocol, an Integrated Drive Electronics (IDE) protocol, a Firewire protocol, etc.

Figure 2A:
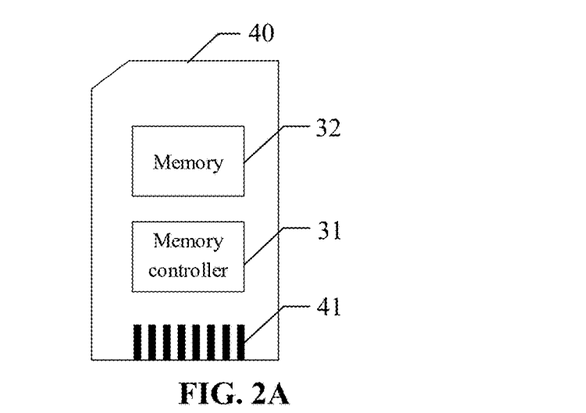
FIG. 2A is a schematic diagram of a memory card comprising a memory provided by examples of the present disclosure.
Figure 2B:
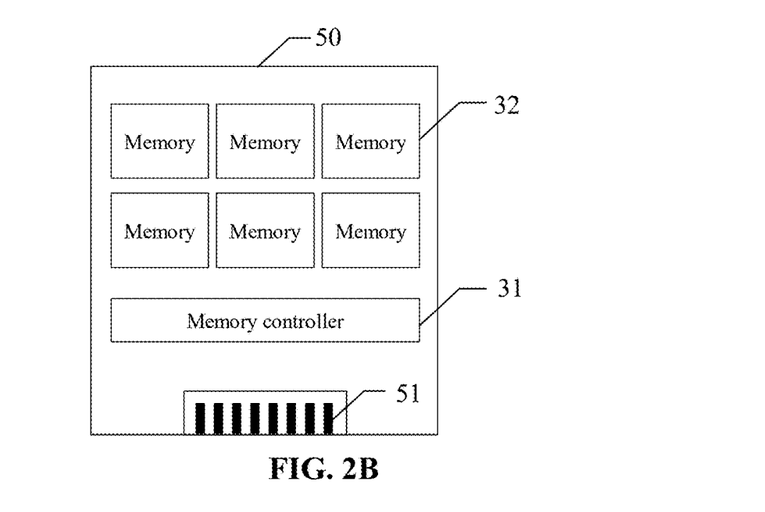
FIG. 2B is a schematic diagram of a solid state disk comprising a memory provided by examples of the present disclosure.

In some examples, the memory controller 31 and the one or more memories 32 may be integrated into various types of memory devices, for example, be included in the same package (e.g., a universal flash storage (UFS) package or an eMMC package). That is to say, the memory system 30 may be implemented and packaged into different types of end electronic products. As shown in FIG. 2A, the memory controller 31 and the single memory 32 may be integrated together to form a memory card 40. The memory card 40 may comprise a PC (Personal Computer Memory Card International Association) card, a CF card, a Smart Media (SM) card, a memory stick, a Multi-Media Card (MMC, a RS-MMC (Reduced-Size MMC), and MMCmicro), an SD card (SD, miniSD, microSD, and SDHC (Secure Digital High Capacity)), a UFS, etc. The memory card 40 may further comprise a memory card connector 41 coupling the memory card 40 with a host (e.g., the host 20 in FIG. 1). In another example as shown in FIG. 2B, the memory controller 31 and the plurality of memories 32 may be integrated together to form an SSD 50. The SSD 50 may further comprise an SSD connector 51 coupling the SSD 50 with a host (e.g., the host 20 in FIG. 1). In some implementations, a storage capacity and/or an operation speed of the SSD 50 are greater than a storage capacity and/or an operation speed of the memory card 40.

In some examples, when the memory system 30 receives a shutdown signal sent by the host 20 but is not shut down, the memory system 30 does not respond to any subsequent command sent by the host 20 to the memory system 30. The shutdown signal is issued by the host 20 to the memory system 30 to inform, by the host 20, the memory system 30 of upcoming shutdown, facilitating the memory system 30 to execute a preparation operation before the shutdown so as to prevent data loss of the memory system 30. After receiving the shutdown signal and then starting the preparation operation before the shutdown, the memory system 30 does not respond to any command sent by the host 20.

The setting of the memory system 30 that no response is made to any command after the shutdown signal, when mixed in some complex operational or failure scenarios, is prone to raise suspicion that the firmware of the memory system 30 abnormally crashes, which brings risks to upper-level system applications and quick failure analysis. For example, in some application scenarios of the memory system 30, one memory system 30 is applied simultaneously in correspondence with multiple software or even systems, which leads to a rapid increase in operational complexity. Once the shutdown signal is triggered by operation of a certain application or virus which is not recorded or coupled, it is difficult to quickly rule out the suspicion of the firmware itself of the memory system 30 when encountering the problem of the memory system 30 not responding to the command issued by the host 20. In this case, the memory system 30 is in a difficult state for analysis. Even if a subsequent debugging can rule out the suspicion of the firmware of the memory system 30, the efficiency of the failure analysis is reduced, and an RMA (return material authorization) rate of the product increases, which is undesirable for manufacturers. Meanwhile, the failure of the system application to perform abnormal command processing causes a system-level failure, which is unacceptable for customers and users.

In view of this, the present disclosure provides a memory controller for accelerating the analysis on the cause why the memory controller does not respond to commands of the host.

Figure 3:
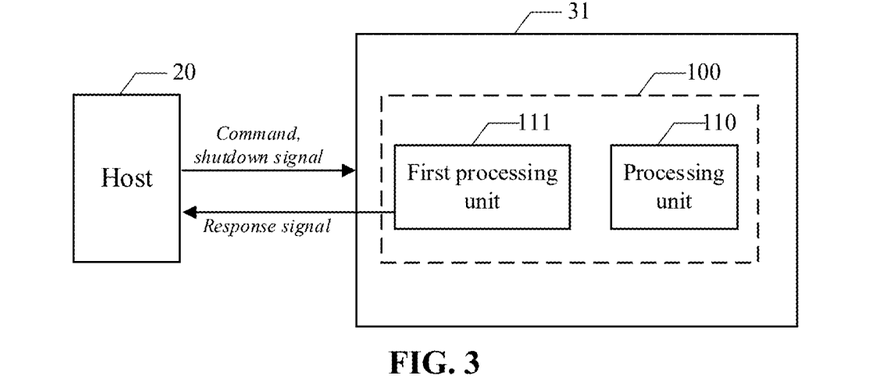
FIG. 3 is a schematic diagram of a memory controller provided by examples of the present disclosure.

FIG. 3 is a schematic diagram of a memory controller provided by examples of the present disclosure. As shown in FIG. 3, the memory controller 31 comprises a processor 100. The processor 100 is configured such that a shutdown preparation operation is executed in response to a shutdown signal, wherein the shutdown preparation operation comprises stopping running some of processing units 110 in the processor; and a first processing unit 111 that continues to run in the processor outputs a response signal in response to receiving a command after the shutdown preparation operation, wherein the response signal is configured to indicate that the processor has executed the shutdown preparation operation.

Figure 4:
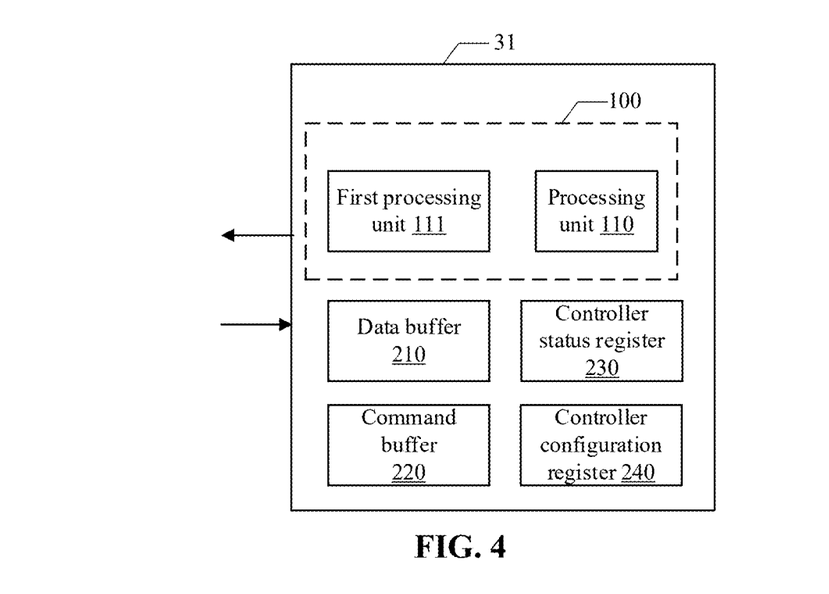
FIG. 4 is a schematic diagram of another memory controller provided by examples of the present disclosure.

The shutdown preparation operation is a preparation operation before shutdown. In some examples, as shown in FIG. 4, the memory controller further comprises a data buffer 210, a command buffer 220, and a controller status (CSTS) register 230. In an example, the shutdown preparation operation comprises: saving data in the data buffer 210 to a memory coupled to the memory controller (e.g., the memory 32 in FIGS. 1 to 2B), aborting the execution of a command in the command buffer 220, updating a value of a shutdown status (SHST) field in the controller status register 230, i.e., a value of CSTS.SHST, to a specified value indicating the completion of the shutdown preparation operation after the data saving and command execution aborting operations are completed, and stopping running some of processing units 110 in the processor.

It is to be noted that the data in the data buffer 210 is saved to a memory where the data will not be lost after power loss, such as a NAND memory. In an example, the data buffer 210 and the processor 100 may be included in the same package and packaged into one chip. In another example, the data buffer 210 and the processor 100 may be included in different packages, for example, the data buffer 210 is packaged separately into one chip. The separately packaged data buffer 210 may be a DRAM memory.

The shutdown status field (CSTS.SHST) in the controller status register 230 is configured to indicate an execution situation of the shutdown preparation operation initiated by the shutdown signal sent by the host. For example, the value of CSTS.SHST being 01b indicates that the shutdown preparation operation is in progress. The value of CSTS.SHST being 10b indicates that the execution of the shutdown preparation operation is completed. When receiving the shutdown signal sent by the host, the memory controller will update the value of CSTS.SHST to 01b and start executing the shutdown preparation operation. When the memory controller updates the value of CSTS.SHST to 10b, it indicates that the execution of the shutdown preparation operation is completed.

After the memory controller completes the actions of saving the data, aborting the command, and updating the value of CSTS.SHST to 10b, the processing units in the processor configured to execute these operations also stop running, and only a few processing units in the memory controller continue to run. Here, stopping running the processing units refers to putting the processing units in a shutdown status, such as no longer executing the commands or operations. If the electronic apparatus is powered off normally, the stopped processing units will be shut down after the shutdown preparation operation.

The first processing unit 111 is one of the processing units in the processor that continue to run after the shutdown preparation operation. In some examples, the first processing unit 111 may be a wake-up logic.

When the electronic apparatus is powered off normally, after the host determines that the memory controller completes the execution of the shutdown preparation operation, the host disconnects a main power supply of the memory controller, and may provide an auxiliary power supply for the wake-up logic in the memory controller, and at this point, the memory system enters a D3 status. The wake-up logic may wake up the memory system from the D3 status and switch to a D0 status when the host re-provides the main power supply to the memory controller. The D3 status is called a Full-off status, and the D0 status is called a Full-on status. The D0 status and the D3 status are apparatus power consumption status involved in the Nvme protocol.

In some other examples, the processor 100 may be a multi-core processor. The multi-core processor comprises a plurality of cores. One of the plurality of cores comprises the first processing unit 111. In other words, after receiving the shutdown signal, the memory controller stops running most of the cores, leaving only one core continuing to run. The core continuing to run comprises the first processing unit.

After the processor executes the shutdown preparation operation, the first processing unit outputs a response signal in response to receiving a command. Here, it is to be noted that the first processing unit outputs the response signal in response to the operation of receiving the command. In other words, the operation of receiving the command triggers the first processing unit to output the response signal. As long as it receives the command, regardless of which kind of command, the first processing unit will return the response signal to the host. The response signal is configured to indicate that the processor has executed the shutdown preparation operation before receiving the command. If the memory controller does not receive the command after the shutdown preparation operation, the first processing unit will not output the response signal.

After receiving the shutdown signal issued by the host and executing the shutdown preparation operation, the memory controller will update the CSTS.SHST field to 01b, indicating the completion of the execution of the shutdown preparation operation. However, the memory controller will not send a shutdown response signal for the shutdown signal to the host, i.e., will not actively informing the host whether the shutdown preparation operation is executed. When the electronic apparatus is powered off normally, the host may determine, according to the normal power-off processing procedure, whether the memory controller completes the execution of the shutdown preparation operation by other methods (e.g., by inquiring CSTS.SHST in turn) after issuing the shutdown signal. However, if some application or virus operations trigger the shutdown signal, which is not recorded or coupled with other operations, resulting in the problems that commands continuing to be sent after the shutdown signal are not responded, the host terminal does not have a shutdown response signal to prove that the host has issued the shutdown signal before, and at this time, it is difficult to determine the cause why the command is not responded, and the firmware of the memory controller is prone to be suspected as the cause why the command is not responded.

The examples of the present disclosure propose that after the memory controller receives the shutdown signal of the host and starts to execute the shutdown preparation operation, if the command is received, the response signal is sent to the host in response to the action of receiving the command so as to inform the host that the memory controller receives the shutdown signal and executes the shutdown preparation operation before receiving the command. In other words, in the examples of the present disclosure, the memory controller may respond to the command received after the shutdown signal, and informs the host that the shutdown preparation operation is executed through the response signal. If the problem that the memory controller does not process the commands happens, whether the problem is caused by the memory controller executing the shutdown preparation operation can be quickly determined through the response signal, and if so, the suspicion of the firmware fault of the memory system can be basically ruled out, thereby facilitating quick failure analysis. Especially in some complex failure scenarios, the response signal can quickly and effectively rule out the suspicion of the firmware of the memory system. Furthermore, the response signal may reduce the probability of the memory system not responding to the commands, thereby enabling the host to obtain a larger number of accurate states of the memory system, improving the application stability of the electronic apparatus comprising the memory system, reducing the probability of application failures or errors of the electronic apparatus, effectively reducing the RMA rate of the product, and improving product reputation and competitiveness.

In addition, if a shutdown response signal is directly sent after the shutdown signal to inform the host that the shutdown preparation operation is executed, the host may receive the shutdown response signal during normal power-off, which may affect the existing normal power-off process and result in new problems. In this example, if no command is received after the shutdown signal, the first processing unit will not send the response signal and will not affect the normal power-off process. The response signal will be returned only when the shutdown signal is abnormally triggered and causes the host to continue sending the command after the shutdown signal. Accordingly, in this example, the first processing unit is triggered by the command to return the response signal, which requires little change to the existing firmware logic, and such a change is less coupled with other logics, which basically does not introduce new problems and facilitates maintaining the reliability and stability of the product.

In some examples, the first processing unit may output the response signal in response to a first command after the shutdown preparation operation and will not respond to commands after the first command. The first command may be any command, and is only configured to trigger the first processing unit to output the response signal. Since the cause of failure can be judged according to the response signal of the first command, such a setting in this example may reduce power consumption.

In some other examples, it may be also possible that after the shutdown preparation operation, the first processing unit outputs a response signal in response to receiving a command every time, wherein the response signal corresponding to each command indicates that the processor has executed the shutdown preparation operation. With such a setting, even if the response signal corresponding to a certain command is lost, the response signals corresponding to other commands may still inform the host that the memory has executed the shutdown preparation operation, which enables the host to obtain a larger number of accurate states of the memory system, thereby improving the reliability of the electronic apparatus.

In some examples, the response signal may be also configured to indicate a relationship between an execution result of the command and the executed shutdown preparation operation. It should be understood that, as described above, after the shutdown preparation operation, the memory controller no longer processes the commands, and accordingly, the execution result of the command is a command of abortion. In an example, the relationship between the execution result of the command and the executed shutdown preparation operation is that the command is aborted due to the executed shutdown preparation operation. The response signal provided by this example comprises the relationship between the execution result of the command and the executed shutdown preparation operation, which can provide a more direct and accurate indication of the cause why the command is not processed in some complex failure scenarios, thereby accelerating the failure analysis.

In some examples, the shutdown signal has various types, and different types of the shutdown signal correspond to different types of the shutdown preparation operation. The processor is configured such that
   a corresponding shutdown preparation operation is executed in response to the different types of the shutdown signal; and
   the first processing unit outputs different response signals in response to receiving commands, wherein the response signal is further configured to indicate a type of the executed shutdown preparation operation.

The electronic apparatus may comprise one or more memory systems. Each memory system may comprise one or more memory controllers, a memory, and additional assemblies. Each memory system can independently complete all types of tasks, and the electronic apparatus with a plurality of memory systems has better performance. As the application scenarios of the electronic apparatus become complex, various shutdown requirements are proposed for the memory system. Therefore, the host controls the memory system to achieve different types of the shutdown preparation operation by issuing different types of the shutdown signal.

The different types of the shutdown signal correspond to the different types of the shutdown preparation operation. The response signal indicates the type of the executed shutdown preparation operation, which is equivalent to indicating the type of the shutdown signal. In an example, the different types of the shutdown signal are configured to control different regions in the memory system to execute the shutdown preparation operation. In other words, the different types of the shutdown preparation operation correspond to the different regions where the shutdown preparation operation is executed.

In this example, the response signal indicates the type of the shutdown preparation operation, and provides the host with a more detailed status of the memory system, thereby accelerating the failure analysis. Taking different types of the shutdown preparation operation corresponding to different regions where the shutdown preparation operation is executed as an example, according to the response signal, it can be quickly determined which region within the memory system has executed the shutdown preparation operation, which is beneficial to quickly ruling out the suspicion of firmware fault in these regions, thereby facilitating quick failure analysis.

In some examples, the shutdown signal comprises a controller shutdown signal and a subsystem shutdown signal. The processor is configured such that
   a first type of the shutdown preparation operation is executed in response to the controller shutdown signal; and the first processing unit outputs a first response signal in response to receiving a command, wherein the first response signal is configured to indicate that the processor has executed the first type of the shutdown preparation operation, and the first response signal is also configured to indicate a relationship between an execution result of the command and the first type of the shutdown preparation operation; or
   a second type of the shutdown preparation operation is executed in response to the subsystem shutdown signal; and the first processing unit outputs a second response signal in response to receiving a command, wherein the second response signal is configured to indicate that the processor has executed the second type of the shutdown preparation operation, and the second response signal is also configured to indicate a relationship between an execution result of the command and the second type of the shutdown preparation operation.

The controller shutdown signal is configured to control any one or more of the memory controllers to execute the shutdown preparation operation. In an example, the controller shutdown signal may control any one of the memory controllers in any one of subsystems to execute the shutdown preparation operation, may also simultaneously control the plurality of memory controllers in one subsystem to execute the shutdown preparation operation, and may further simultaneously control the plurality of memory controllers in different subsystems to execute the shutdown preparation operation. In an example, the host may issue the controller shutdown signal to inform a certain memory controller of upcoming shutdown, such that the memory controller executes the shutdown preparation operation to prevent data loss occurring in the memory managed by the memory controller.

The subsystem shutdown signal is configured to control all the memory controllers in one or more subsystems to execute the shutdown preparation operation, wherein one subsystem refers to one memory system. In an example, the host may issue the subsystem shutdown signal to inform all the memory controllers in one subsystem of the upcoming shutdown, such that all the memory controllers in the subsystem execute the shutdown preparation operation to prevent data loss in the subsystem.

In some examples, from the perspective of the memory controller, the first type of the shutdown preparation operation or the second type of the shutdown preparation operation executed by the memory controller after receiving the controller shutdown signal or a subsystem control signal may be substantially the same, i.e., saving the data, aborting the command, updating the value of CSTS.SHST to 10b, and stopping running some of processing units as described above. However, the response signal outputted by the first processing unit after receiving the command may indicate the type of the shutdown preparation operation, i.e., may indicate whether the first type of the shutdown preparation operation or the second type of the shutdown preparation operation is executed by the memory controller. It may also be understood that the response signal may indicate the type of the shutdown signal to provide more accurate state information of the memory controller, which is beneficial for the failure analysis and basically does not increase the workload of the processor.

In an example, according to the first response signal fed back by the memory controller, it may be proven that the memory controller itself executes the shutdown preparation operation, ruling out the suspicion of firmware fault of itself and the memory controlled by the memory controller. The second response signal fed back by the memory controller not only indicates that the memory controller executes the second type of the shutdown preparation operation but also indicates that all memory controllers in the subsystem where the memory controller is located executes the second type of the shutdown preparation operation. Therefore, according to the second response signal fed back by one memory controller, the suspicion of all firmware in the subsystem where the memory controller is located can be ruled out, so that the abnormal point can be located more accurately and the failure analysis can be accelerated.

In some examples, as shown in FIG. 4, the host further comprises a controller configuration register 240. The host issues the controller shutdown signal to the memory controller by setting a value of a shutdown notification (SHN) field in the controller configuration (CC) register, i.e., a value of CC.SHN. In an example, the host sets the CC.SHN field to 01b, indicating that the host informs the memory controller of normal shutdown. The host sets the CC.SHN field to 10b, indicating that the host informs the memory controller of abrupt shutdown. Regardless of whether the host issues a normal controller shutdown signal or an abrupt controller shutdown signal, the memory controller executes the shutdown preparation operation. In addition, after the normal controller shutdown signal or the abrupt controller shutdown signal, the first processing unit outputs a response signal in response to receiving a command.

In some examples, in the NVMe 2.0 specification, the host issues the subsystem shutdown signal to the memory controller by setting a value of an NSSD.NSSC (NVM subsystem shutdown. NVM subsystem shutdown control) field. In an example, the host writes a value 4E726D6Ch ("Nrml") to NSSD.NSSC, indicating that the host informs each memory controller in the subsystem of the normal shutdown. The host writes a value 41627074h ("Abpt") to NSSD.NSSC, indicating that the host informs each memory controller in the subsystem of the abrupt shutdown.

In some other examples, in the NVMe-MI (NVM Express Management Interface) specification, the host issues the subsystem shutdown signal to the memory controller by sending an NVMe-MI shutdown command to the memory controller. In an example, when the NVMe-MI shutdown command specifies the normal shutdown, it indicates that the host informs each memory controller in the subsystem of the normal shutdown. When the NVMe-MI shutdown command specifies the abrupt shutdown, it indicates that the host informs each memory controller in the subsystem of the abrupt shutdown. Regardless of whether the host issues the normal subsystem shutdown signal or the abrupt subsystem shutdown signal, the memory controller executes the shutdown preparation operation. In addition, after the normal subsystem shutdown signal or the abrupt subsystem shutdown signal, the first processing unit outputs a response signal in response to receiving a command.

In some examples, the response signal comprises a status code. The status code comprises information configured to indicate the type of the executed shutdown preparation operation, and the status codes of different response signals are different. The status code records more detailed status using text information. In this example, the status code comprises the information configured to indicate the type of the executed shutdown preparation operation, and may also comprise information configured to indicate the relationship between the execution result of the command and the shutdown preparation operation. In an example, if the host issues the controller shutdown signal, the status code in the first response signal returned by the memory controller in response to receiving the command is, for example, "Commands Aborted due to Controller Shutdown", which may be translated as: the command is aborted because the processor has executed the first type of the shutdown preparation operation corresponding to the controller shutdown signal. In an example, if the host issues the subsystem shutdown signal, the status code in the second response signal returned by the memory controller in response to receiving the command is, for example, "Commands Aborted due to Subsystem Shutdown", which may be translated as: the command is aborted because the processor has executed the second type of the shutdown preparation operation corresponding to the subsystem control signal. The host can learn the processor having executed the shutdown preparation operation, the type of the shutdown signal corresponding to the shutdown preparation operation, and cause of a command of abortion, according to the status code in the response signal. The present disclosure does not limit the specific content of the response signal or specific text information of the status code, as long as the response signal meets functional requirements of the present disclosure.

In some examples, vendor specific state codes C0h-FFh may be used to describe the type of the shutdown signal. The vendor specific state codes are user-definable status codes. Using the vendor specific state codes to return the type of the shutdown signal will not affect data transmission, etc., and is safe and reliable.

Figure 5:
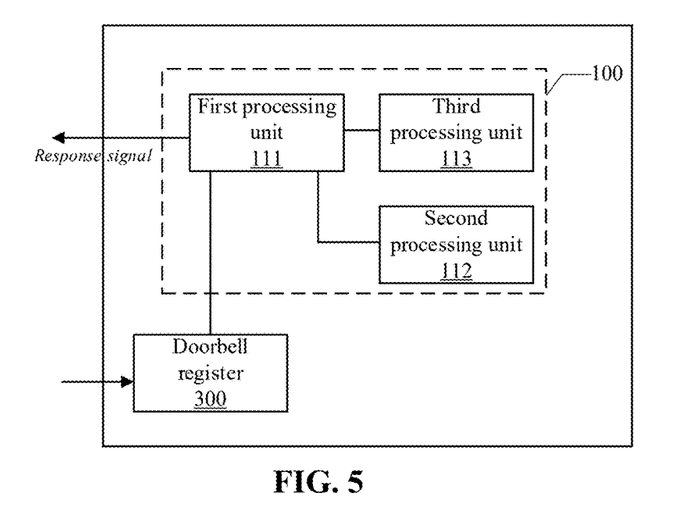
FIG. 5 is a schematic diagram of yet another memory controller provided by examples of the present disclosure.

Next, the examples of the present disclosure will introduce a generation process of the response signal. FIG. 5 is a schematic diagram of yet another memory controller provided by examples of the present disclosure. In some examples, as shown in FIG. 5, the processor further comprises a second processing unit 112 coupled to the first processing unit 111. The second processing unit 112 is configured to generate a parsing signal indicating the type of the shutdown signal in response to the shutdown signal and transmit the parsing signal to the first processing unit 111. The first processing unit 111 is configured to generate a response signal according to the parsing signal in response to receiving a command.

The second processing unit 112 is one of a plurality of processing units in the processor 100. In an example, the second processing unit 112 may stop running after sending the parsing signal to the first processing unit 111. The second processing unit 112 may be a processing unit that stops running during the shutdown preparation operation.

In an example, the second processing unit 112 may determine the type of the shutdown signal according to a value of the CC.SHN field, a value of the NSSD.NSSC field, or an NVMe-MI command issued by the host, and generate the parsing signal that comprises parameters recording the type of the shutdown signal. The second processing unit 112 sends the parsing signal to the first processing unit 111, and then the second processing unit 112 may stop running and is in a status ready for shutdown.

When the memory controller receives a command, the first processing unit 111 will generate a corresponding response signal according to the type of the shutdown signal in the parsing signal. For example, the first processing unit generates a first response signal according to the type of the shutdown signal in the parsing signal being the controller shutdown signal; or generates a second response signal according to the type of the shutdown signal in the parsing signal being the subsystem shutdown signal. It is to be noted that, in some other examples, the first processing unit 111 may also generate the response signal according to the parsing signal before the memory controller receives the command, and output the response signal when receiving the command. Even if the response signal needs to indicate the relationship between the execution result of the command and the executed shutdown preparation operation, the response signal may be also generated before the command is received, because the execution result of the command is already known after the shutdown preparation operation, i.e., the execution result of the command is a command of abortion. Therefore, in this case, the response signal may be also generated in advance.

In some examples, the second processing unit may be a front-end NVMe command processing unit of the memory controller, which is configured to parse commands from the host.

In this example, existing hardware in the memory controller is directly utilized to generate the response signal in multiple procedures according to functions of different modules in the hardware, such that the response signal may be generated without modifying the hardware, thereby reducing costs and having high adaptability with the existing hardware.

It should be further noted that in some other examples, the second processing unit 112 may also directly generate a response signal in response to a shutdown signal, and send the response signal to the first processing unit 111, and the first processing unit 111 outputs a response signal in response to receiving a command.

In some examples of the present disclosure, the hardware may not be modified, and only a firmware logic needs to be modified, i.e., adding a REPLY_TASK assigned to the first processing unit. In an example, the REPLY_TASK may be started during the execution of the shutdown preparation operation, such that the first processing unit monitors whether a command is received, and when the command is received, a response signal is outputted.

In some examples, starting the REPLY_TASK may be achieved by sending a monitoring start signal to the first processing unit. In an example, as shown in FIG. 5, the processor further comprises: a third processing unit 113 coupled to the first processing unit 111. The third processing unit 113 is configured to: generate and send the monitoring start signal to the first processing unit 111 in response to the shutdown signal; and the first processing unit 111 is configured to: monitor whether the processor receives the command in response to the monitoring start signal, and output the response signal if monitoring that the processor receives the command.

The third processing unit 113 is one of the plurality of processing units in the processor 100. In an example, the third processing unit 113 may stop running after sending the monitoring start signal to the first processing unit 111. The third processing unit 113 may be a processing unit that stops running during the shutdown preparation operation.

In this example, only after receiving the shutdown signal, the memory controller informs the first processing unit to start the REPLY_TASK, i.e., starting the REPLY_TASK is triggered by the shutdown signal. When no shutdown signal is received, the memory controller does not start the REPLY_TASK, i.e., in the case where no shutdown signal is received, the memory controller does not output the response signal indicating that the shutdown preparation operation has been executed as provided by the examples of the present disclosure for the command, but outputs the response signal for the normal execution of the command, thereby avoiding interference with the response signal for the normally executed command, i.e., reducing a coupling effect with the existing firmware logic.

In some examples, the last procedure before the processor updates the CSTS.SHST field to 10b is to send the monitoring start signal and the parsing signal to the first processing unit. In other words, the processor starts the REPLY_TASK after basically completing the shutdown preparation operation. Such a setting may minimize the impact on the sequence of operations in the existing shutdown preparation.

It should be understood that in some examples, after the shutdown preparation operation mentioned in the examples of the present disclosure, in the process of outputting the first response signal in response to receiving the command, there may be a more specific time instant after the shutdown preparation operation, such as a time instant after the first processing unit receives the monitoring start signal and the parsing signal, or a time instant after the first processing unit receives the monitoring start signal and the response signal. In other words, after the shutdown preparation operation in this procedure does not strictly refer to that all shutdown preparation operations are executed, but rather refers to after the first processing unit starts the REPLY_TASK upon receiving the shutdown signal.

In some examples, the processor is configured such that the first processing unit outputs a response signal in response to receiving a command after the shutdown preparation operation and before the memory controller is shut down. The memory controller being shut down means that all components in the memory controller, including the first processing unit, are shut down. If the memory controller is shut down after the shutdown preparation operation, the REPLY_TASK in the first processing unit is aborted as the memory controller is shut down. When the memory controller is powered on again, the REPLY_TASK does not continue but will be started by triggering the shutdown signal, thereby avoiding interference with the response signal returned during normal command execution by the memory controller.

In some examples, the host and the memory controller are in communication based on the NVMe protocol. When sending the command to the memory, the host needs a submission queue (SQ), a completion queue (CQ), and a doorbell register (DB). The doorbell register is located in the memory controller, and the submission queue and the completion queue are located in the host. When sending the command, the host does not directly send the command to the memory controller. Instead, the command is first written to the submission queue, and then a value of the doorbell register in the memory controller corresponding to the submission queue is updated, such that the memory controller is notified that there is a new command to be executed. Then, after receiving the notification, the memory controller retrieves and executes the command from the submission queue of the host. After executing the command, the memory controller writes an execution result of the command to the completion queue of the host, and then sends an interrupt signal to inform the host that the command has been completed. After receiving the interrupt signal, the host retrieves an execution result of the command from the completion queue and starts processing. Finally, when the host finishes the processing, the value of the doorbell register in the memory controller corresponding to the completion queue is updated.

In this example, as shown in FIG. 5, the first processing unit 111 is coupled to the doorbell register 300, and is configured to output a response signal in response to the doorbell register 300 being updated after the shutdown preparation operation; and the doorbell register 300 is updated to indicate that the host sends a command to the memory controller.

The host informs the memory controller to retrieve the command by updating the doorbell register, and for the memory controller, the doorbell register being updated means that the command is received. The first processing unit monitors whether the doorbell register is updated, indicating that the first processing unit determines whether to output the response signal in response to the action of receiving the command, regardless of whether the command is processed.

In the related technologies, after the shutdown signal, the memory controller does not execute the command, and does not send the response signal to the host either. However, in this example, for a command after the shutdown signal, the memory controller does not extract (i.e., unpack) the command from an extraction queue and does not execute the command either, which is consistent with the related technologies. But in this example, the memory controller may return a response signal to the host according to a bell synchronized with the command (referring to the action of updating the doorbell register). Through a simple modification of firmware logic, a simple response is made to the command after the shutdown signal without unpack so as to inform the host of a current status of the memory controller, which not only can ensure the current reliability of the memory system, but also improve the capability of the memory system to report abnormal and error information.

It is to be noted that the examples of the present disclosure do not limit the method of command interaction between the host and the memory controller, and do not limit the method that the memory controller responds to receiving the command either. When architectures of the memory controller differ, resulting in different command interaction methods adopted between the host and the memory controller, the methods that the first processing unit responds to receiving the command may be different, and are not limited to the above-mentioned response to the bell synchronized with the command.

In some examples, the first processing unit 111 is configured to write the response signal to the completion queue in response to the command after the shutdown signal. The processor 110 is further configured to output the interrupt signal after the first processing unit writes the response signal to the completion queue, wherein the interrupt signal is configured to indicate to the host that the response signal is written to the completion queue.

In this example, the memory controller does not directly send the response signal to the host, but writes the response signal to the completion queue of the host, and informs, through the interrupt signal, the host to retrieve the response signal from the completion queue. The method that the memory controller returns the response signal to the host provided by this example also adopts the command response method specified in the above-mentioned NVMe protocol, which utilizes the existing hardware in the memory controller without adding new hardware, thereby saving costs and reducing the impact on the existing hardware and functions. It should be understood that in other examples, when the host and the memory controller adopt other command interaction methods, the method that the memory controller returns the response signal to the host may be different from this example. In other words, the method that the memory controller returns the response signal to the host may vary in different specific implementations, which is not limited in the present disclosure.

The technical solution provided by the present disclosure is described in detail in conjunction with three specific implementations below.

Figure 6:
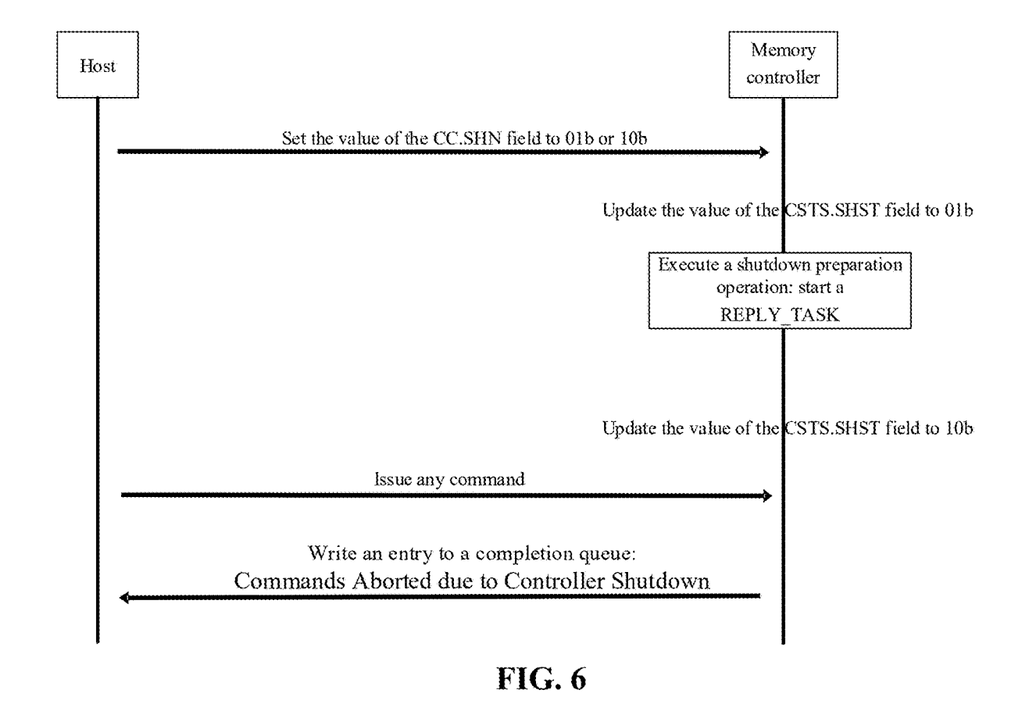
FIG. 6 is a schematic diagram of signal interaction between a host and a memory controller provided by examples of the present disclosure.

FIG. 6 is a schematic diagram of signal interaction between a host and a memory controller provided by examples of the present disclosure. According to the examples of the present disclosure, based on the existing hardware, a REPLY_TASK is configured on the first processing unit still running after the shutdown preparation operation. As shown in FIG. 6, the host sets the value of the CC.SHN field to 01b or 10b, indicating that a controller shutdown signal is sent to the memory controller. The memory controller updates the value of the CSTS.SHST field to 01b and executes the shutdown preparation operation. Meanwhile, the memory controller generates a parsing signal indicating the type of the shutdown signal according to the controller shutdown signal.

In an example, the last operation procedure before the memory controller updates the value of the CSTS.SHST field to 10b is to start the REPLY_TASK and send the parsing signal to the first processing unit. Then, the memory controller updates the value of the CSTS.SHST field to 10b, indicating that the shutdown preparation operation has been executed.

Subsequently, if the host does not shut down the memory controller but continues to send commands, i.e., the host issues any commands, the first processing unit detects the bell sent synchronously by the host, and generates an entry indicating the type of the shutdown signal, and the entry is the response signal. The first processing unit directly writes an entry (Reply CQE, wherein CQE stands for a Completion Queue entry) to the completion queue. In an example, a status code in the entry may be "Commands Aborted due to Controller Shutdown".

Figure 7:
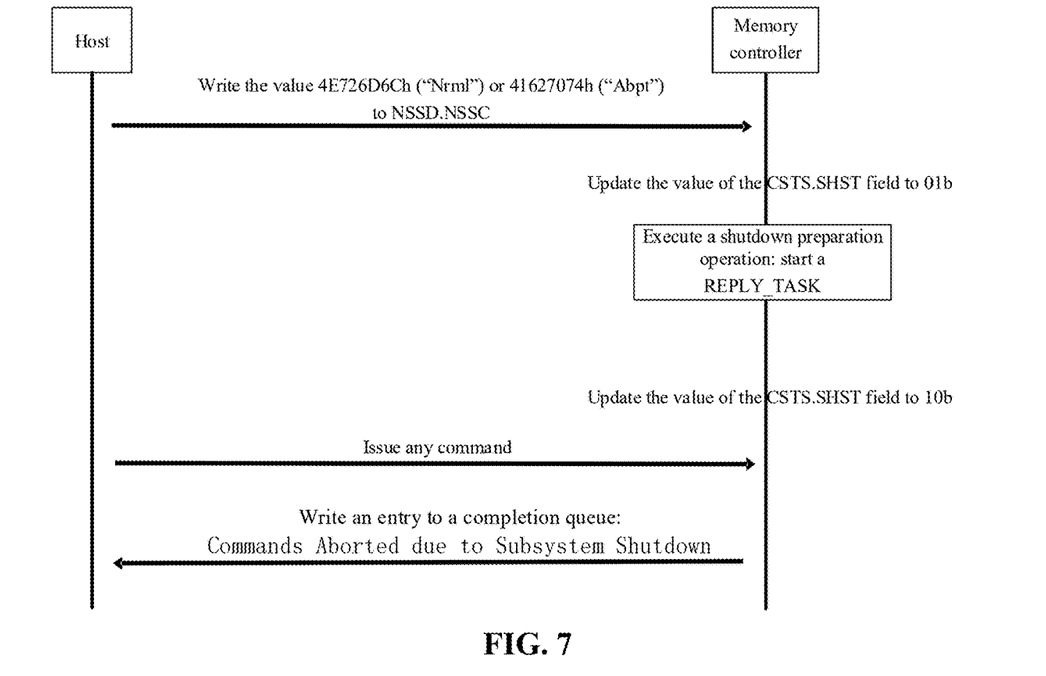
FIG. 7 is a schematic diagram of signal interaction between another host and a memory controller provided by examples of the present disclosure.

FIG. 7 is a schematic diagram of signal interaction between another host and a memory controller provided by examples of the present disclosure. As shown in FIG. 7, the host writes the value 4E726D6Ch ("Nrml") or 41627074h ("Abpt") to NSSD.NSSC, indicating that the subsystem shutdown signal is sent to the memory controller. The memory controller updates the value of the CSTS.SHST field to 01b and executes the shutdown preparation operation. Meanwhile, the memory controller generates a parsing signal indicating the type of the shutdown signal according to the subsystem shutdown signal.

In an example, the last operation procedure before the memory controller updates the value of the CSTS.SHST field to 10b is to start the REPLY_TASK and send the parsing signal to the first processing unit. Then, the memory controller updates the value of the CSTS.SHST field to 10b, indicating that the shutdown preparation operation has been executed.

Subsequently, if the host issues any commands, the first processing unit detects the bell sent synchronously by the host, generates an entry indicating the type of the shutdown signal, and directly writes the entry (Reply CQE) to the completion queue. In an example, a status code in the entry may be Commands Aborted due to Subsystem Shutdown.

Figure 8:
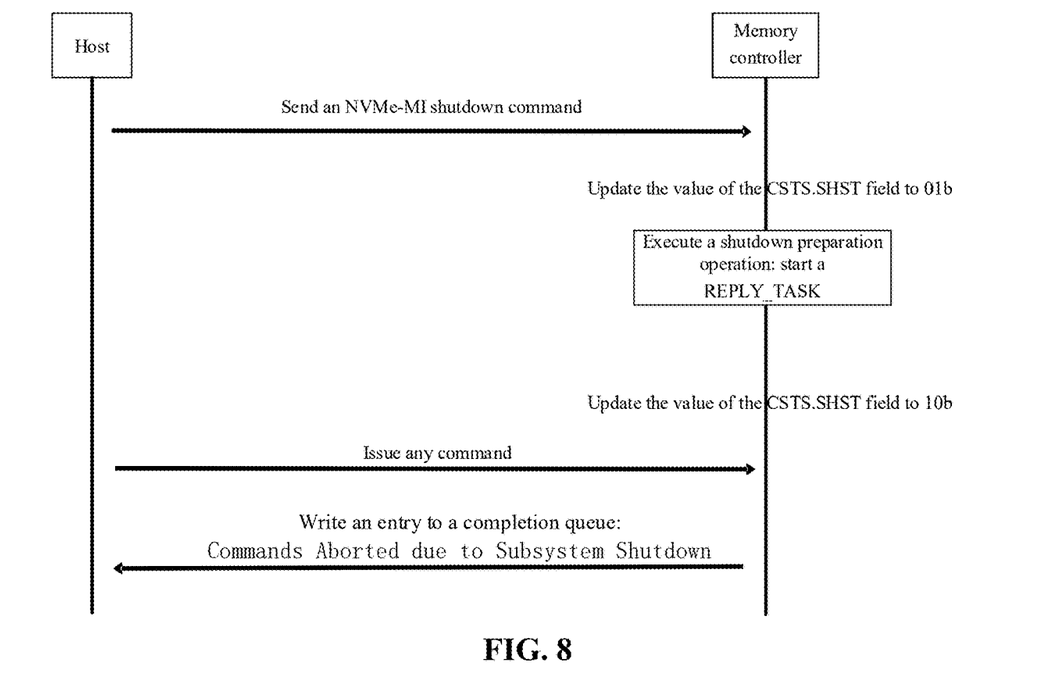
FIG. 8 is a schematic diagram of signal interaction between yet another host and a memory controller provided by examples of the present disclosure.

FIG. 8 is a schematic diagram of signal interaction between yet another host and a memory controller provided by examples of the present disclosure. As shown in FIG. 8, the host issues an NVMe-MI shutdown command to the memory controller, indicating that the subsystem shutdown signal is sent to the memory controller. The memory controller updates the value of the CSTS.SHST field to 01b and executes the shutdown preparation operation. Meanwhile, the memory controller generates a parsing signal indicating the type of the shutdown signal according to the subsystem shutdown signal.

In an example, the last operation procedure before the memory controller updates the value of the CSTS.SHST field to 10b is to start the REPLY_TASK and send the parsing signal to the first processing unit. Then, the memory controller updates the value of the CSTS.SHST field to 10b, indicating that the shutdown preparation operation has been executed.

Subsequently, if the host issues any commands, the first processing unit detects the bell sent synchronously by the host, generates an entry indicating the type of the shutdown signal, and directly writes the entry (Reply CQE) to the completion queue. In an example, a status code in the entry may be Commands Aborted due to Subsystem Shutdown.

In the examples of the present disclosure, after the host issues the shutdown signal, if the memory system is not shut down but commands continue to be sent, the memory system in related technologies makes no response. However, the examples of the present disclosure propose to utilize the first processing unit which continues to run after the shutdown preparation operation to return a simple response signal to the host when receiving the command, so as to inform the memory system of the current status. The memory system actively reports status information to the host, which is beneficial for failure analysis and avoids problems caused by misjudgment of the firmware. In addition, the solution of the present disclosure is implemented based on a plug-in of the existing framework, and only a task program is plugged in the existing framework, which may achieve quick deployment and switching, low development and adaptation costs, simple solution, and low coupling with other firmware logics. The impact on the overall logic of the firmware is low, and basically no new problems will be not caused.

Figure 9:
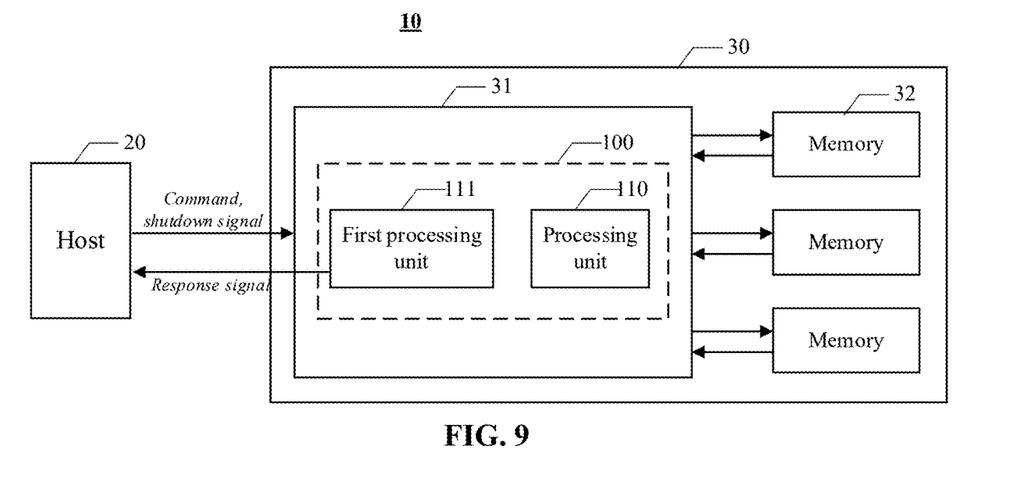
FIG. 9 is a schematic diagram of an electronic apparatus provided by examples of the present disclosure.

Examples of the present disclosure further provide an electronic apparatus. FIG. 9 is a schematic diagram of an electronic apparatus provided by examples of the present disclosure. As shown in FIG. 9, the electronic apparatus 10 comprises a host 20 and a memory system 30 coupled with the host 20. The memory system 30 comprises a memory 32 and a memory controller 31 coupled with the memory 32.

The host 20 is configured to: send a shutdown signal, and send a command after the shutdown signal.

The memory controller 31 is configured to output a response signal to the host in response to receiving the command, wherein the response signal is configured to indicate that a processor has executed the shutdown preparation operation.

In the present disclosure, after the shutdown signal is sent to the memory system, when any command is sent to the memory system, the memory system returns the response signal, indicating that the processor has executed the shutdown preparation operation. As such, the possibility of the host issuing commands without receiving a response can be reduced, and the host can obtain a larger number of accurate states of the memory system, thereby improving the application stability of the electronic apparatus and reducing the error probability of the electronic apparatus. For a memory system level, this solution provides more status returns, which is beneficial for quick failure analysis and providing self-certification to customers.

In some examples, the memory controller 31 is configured to execute the shutdown preparation operation in response to the shutdown signal, wherein the shutdown preparation operation comprises stopping running some of processing units in the processor; and a first processing unit that continues to run in the memory controller outputs an electrical response signal to the host in response to receiving a command.

In this example, a REPLY_TASK is configured on the first processing unit continuing to run after the shutdown preparation operation, such that when the memory controller receives the command, the response signal is actively sent to the host. The first processing unit continuing to run after the shutdown preparation operation is utilized to execute the REPLY_TASK, achieving a low coupling, low impact on the overall logic of the firmware, and low development and adaptation costs.

In some examples, the memory controller comprises a doorbell register. The first processing unit is coupled to the doorbell register. The host is configured to update the doorbell register in the memory controller while sending the command after the shutdown signal. The memory controller is configured such that the first processing unit outputs a response signal to the host in response to the doorbell register being updated.

In some examples, the host comprises a completion queue. The memory controller is configured to write the response signal to the completion queue of the host, and then output an interrupt signal to the host, wherein the interrupt signal is configured to indicate to the host that the response signal is written to the completion queue. The host is configured to: receive the interrupt signal, and look up the response signal from the completion queue in response to the interrupt signal.

In some examples, the host is configured to send different types of the shutdown signal, and the memory controller is configured to output different response signals to the host in response to receiving the command, wherein the response signal is further configured to indicate the type of the shutdown signal.

In some examples, the memory system comprises one or more subsystems. One subsystem comprises one or more memory controllers. The shutdown signal comprises a controller shutdown signal and a subsystem shutdown signal. The controller shutdown signal is configured to control any one or more of the memory controllers to execute the shutdown preparation operation, and the subsystem shutdown signal is configured to control all the memory controllers in the subsystem to execute the shutdown preparation operation.

The memory controller is configured to: output a first response signal to the host in response to receiving a command, wherein the first response signal is configured to indicate that the memory controller has received the controller shutdown signal before receiving the command, and executes a first type of the shutdown preparation operation based on the controller shutdown signal; or
output a second response signal to the host in response to receiving a command, wherein the second response signal is configured to indicate that the memory controller has received the subsystem shutdown signal before receiving the command, and executes a second type of the shutdown preparation operation based on the subsystem shutdown signal.

In this example, the response signal may also indicate the type of the shutdown signal, so as to provide the host with a larger number of accurate states of the memory system, thereby facilitating quick failure analysis.

Figure 10:
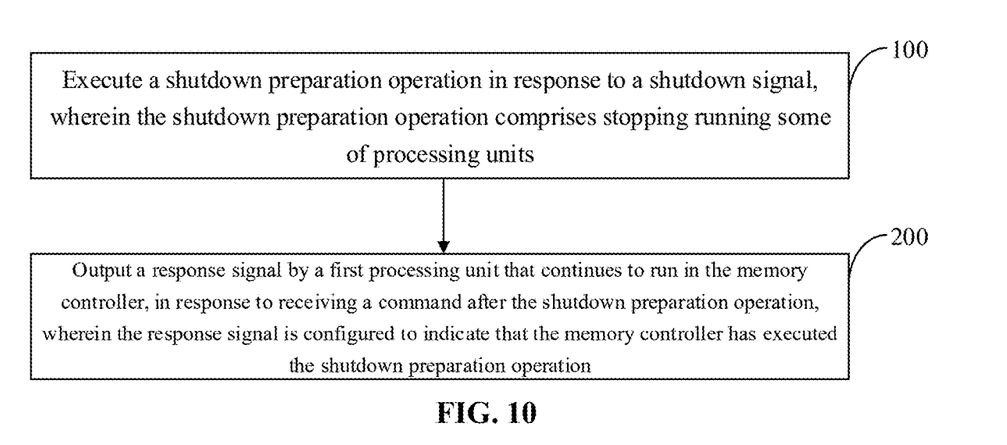
FIG. 10 is a flow diagram of an operation method of a memory controller provided by examples of the present disclosure.

Examples of the present disclosure further provide an operation method of a memory controller. FIG. 10 is a flow diagram of an operation method of a memory controller provided by examples of the present disclosure. As shown in FIG. 10, the operation method comprises:
S100: executing a shutdown preparation operation in response to a shutdown signal, wherein the shutdown preparation operation comprises stopping running some of processing units; and
S200: outputting a response signal by a first processing unit that continues to run in the memory controller, in response to receiving a command after the shutdown preparation operation, wherein the response signal is configured to indicate that the memory controller has executed the shutdown preparation operation.

In some examples, the shutdown signal has various types, and different types of the shutdown signal correspond to different types of the shutdown preparation operation. S100 comprises: executing a corresponding shutdown preparation operation in response to the different types of the shutdown signal. S200 comprises: outputting different response signals by the first processing unit in response to receiving commands, wherein the response signal is further configured to indicate the type of the executed shutdown preparation operation.

In some examples, the operation method further comprises: generating a parsing signal indicating the type of the shutdown signal in response to the shutdown signal; and generating a response signal by the first processing unit according to the parsing signal in response to receiving a command.

In some examples, the memory controller comprises a doorbell register, and the first processing unit is coupled with the doorbell register. S200 comprises: outputting a response signal by the first processing unit, in response to the doorbell register being updated after the shutdown preparation operation, wherein the doorbell register being updated is configured to indicate that the host sends a command to the memory controller.

In some examples, the operation method further comprises: generating a monitoring start signal in response to the shutdown signal; monitoring whether the doorbell register is updated, by the first processing unit in response to the monitoring start signal; and outputting a response signal when monitoring that the doorbell register is updated.

In some examples, the operation method further comprises: outputting an interrupt signal after the first processing unit outputs the response signal, wherein the interrupt signal is configured to indicate to the host that the response signal is written to a completion queue.

In the operation method of the memory controller provided by the examples of the present disclosure, after the memory controller receives the shutdown signal of the host and executes the shutdown preparation operation, if receiving the command, the memory controller sends the response signal to the host in response to the action of receiving the command, so as to inform the host that the memory controller executes the shutdown preparation operation before receiving the command. In other words, in the examples of the present disclosure, the memory controller may respond to the command received after the shutdown signal, which can reduce the probability that the memory system does not respond to the command of the host, thereby reducing the error probability of the electronic apparatus comprising the memory system, and improving the stability of the electronic apparatus. Furthermore, through the response signal, the host can obtain a larger number of accurate states of the memory controller, which facilitates quick failure analysis. For example, if the problem that the memory controller does not process the commands happens, whether the problem is caused by executing the shutdown preparation operation can be quickly determined through the response signal, and if so, the suspicion of a firmware fault of the memory system can be basically ruled out, thereby facilitating quick failure analysis. Especially in some complex failure scenarios, the role of the response signal becomes even more prominent. The suspicion of a firmware of the memory system can be quickly and effectively ruled out, thereby improving the product reputation among customers and product competitiveness.

Regarding to the method in the above examples, its specific implementation method has been described in detail in the examples of the product corresponding to the method, and will not be illustrated in detail here.

In view of this, examples of the present disclosure provide a memory controller, an operation method thereof, and an electronic apparatus.

According to a first aspect of the present disclosure, a memory controller is provided. The memory controller comprises a processor that is configured such that
a shutdown preparation operation is executed in response to a shutdown signal, wherein the shutdown preparation operation comprises stopping running some of processing units in the processor; and
a first processing unit that continues to run in the processor outputs a response signal in response to receiving a command after the shutdown preparation operation, wherein the response signal is configured to indicate that the processor has executed the shutdown preparation operation.

According to a second aspect of the present disclosure, an electronic apparatus is provided, and comprises a host and a memory system coupled with the host. The memory system comprises a memory and a memory controller coupled with the memory;

the host is configured to: send a shutdown signal, and send a command after the shutdown signal; and the memory controller is configured to output a response signal to the host in response to receiving the command, wherein the response signal is configured to indicate that the processor has executed the shutdown preparation operation.

According to a third aspect of the present disclosure, an operation method of a memory controller is provided. The operation method comprises:

executing a shutdown preparation operation in response to a shutdown signal, wherein the shutdown preparation operation comprises stopping running some of processing units in the processor; and outputting a response signal by a first processing unit that continues to run in the processor, in response to receiving a command after the shutdown preparation operation, wherein the response signal is configured to indicate that the processor has executed the shutdown preparation operation.

In the examples of the present disclosure, after the memory controller receives the shutdown signal of the host and executes the shutdown preparation operation, if the command is received, the memory controller sends the response signal to the host in response to the action of receiving the command, so as to inform the host that the memory controller has executed the shutdown preparation operation before receiving the command. In other words, in the examples of the present disclosure, the memory controller may respond to the command received after the shutdown signal, which can reduce the probability that the memory system does not respond to the command of the host, thereby reducing the probability of errors in the electronic apparatus comprising the memory system, and improving the stability of the electronic apparatus. Furthermore, the host can obtain a larger number of accurate states of the memory controller through the response signal, which facilitates quick failure analysis. For example, if the problem that the memory controller does not process the commands happens, whether the problem is caused by executing the shutdown preparation operation can be quickly determined through the response signal, and if so, the suspicion of a firmware fault of the memory system can be basically ruled out, thereby facilitating quick failure analysis. Especially in some complex failure scenarios, the role of the response signal becomes even more prominent. The suspicion of a firmware of the memory system can be quickly and effectively ruled out, thereby improving the product reputation among customers and enhancing product competitiveness.

The above descriptions are merely implementations of the present disclosure, and the protection scope of the present disclosure is not limited thereto. Any variation or replacement that may be readily figured out by a person skilled in the art within the technical scope disclosed by the present disclosure shall fall within the protection scope of the present disclosure. Therefore, the protection scope of the present disclosure shall be defined by the protection scope of the claims.

What is claimed is:

1. A memory controller, comprising a processor that is configured such that:

a shutdown preparation operation is executed in response to a shutdown signal, wherein the shutdown preparation operation includes stopping running of some processing units in the processor; and a first processing unit that continues to run in the processor outputs a response signal in response to receiving a command after the shutdown preparation operation, wherein the response signal is configured to indicate that the processor has executed the shutdown preparation operation.

2. The memory controller of claim 1, wherein the response signal is further configured to indicate a relationship between an execution result of the command and the executed shutdown preparation operation.

3. The memory controller of claim 1, wherein the shutdown signal has different types, and the different types of the shutdown signal correspond to different types of the shutdown preparation operation, and the processor is configured such that:

a corresponding shutdown preparation operation is executed in response to the different types of the shutdown signal; and the first processing unit outputs different response signals in response to receiving the command, wherein the response signal is further configured to indicate a type of the executed shutdown preparation operation.

4. The memory controller of claim 3, wherein the response signal includes a status code, wherein the status code includes information configured to indicate the type of the executed shutdown preparation operation, and status codes of the different response signals are different.

5. The memory controller of claim 3, wherein the shutdown signal includes a controller shutdown signal and a subsystem shutdown signal, and the processor is configured such that:

a first type of the shutdown preparation operation is executed in response to the controller shutdown signal, and the first processing unit outputs a first response signal in response to receiving the command, wherein the first response signal is configured to indicate that the processor has executed the first type of the shutdown preparation operation; or a second type of the shutdown preparation operation is executed in response to the subsystem shutdown signal, and the first processing unit outputs a second response signal in response to receiving the command, wherein the second response signal is configured to indicate that the processor has executed the second type of the shutdown preparation operation.

6. The memory controller of claim 1, wherein the processor further includes:

a second processing unit coupled to the first processing unit;

the second processing unit is configured to generate a parsing signal indicating a type of the shutdown signal in response to the shutdown signal, and transmit the parsing signal to the first processing unit; and the first processing unit is configured to generate the response signal according to the parsing signal in response to receiving the command.

7. The memory controller of claim 6, further including a doorbell register, wherein the first processing unit is coupled to the doorbell register, and is configured to:

output the response signal in response to the doorbell register being updated after the shutdown preparation operation; and the doorbell register is updated to indicate that a host sends the command to the memory controller.

8. The memory controller of claim 7, wherein the processor further includes:
a third processing unit coupled to the first processing unit;
the third processing unit is configured to generate and send a monitoring start signal to the first processing unit in response to the shutdown signal; and
the first processing unit is configured to monitor whether the doorbell register is updated in response to the monitoring start signal.

9. The memory controller of claim 1, wherein the memory controller further includes a command buffer, a data buffer, and a controller status register; and
the shutdown preparation operation further includes:
aborting execution of a command in the command buffer;
saving data in the data buffer to a memory configured to be coupled with the memory controller; and
updating a value of a shutdown status field in the controller status register to a specified value indicating completion of the shutdown preparation operation.

10. The memory controller of claim 1, wherein the processor is further configured to output an interrupt signal after the first processing unit outputs the response signal, wherein the interrupt signal is configured to indicate to a host that the response signal is written to a completion queue.

11. The memory controller of claim 1, wherein the processor is configured such that the first processing unit outputs the response signal in response to receiving the command after the shutdown preparation operation and before the memory controller is shut down.

12. An electronic apparatus, comprising a host and a memory system coupled with the host, wherein the memory system includes a memory and a memory controller coupled with the memory, and
the host is configured to:
send a shutdown signal; and
send a command after the shutdown signal; and
the memory controller is configured to output a response signal to the host in response to receiving the command, wherein the response signal is configured to indicate that the memory controller has executed a shutdown preparation operation.

13. The electronic apparatus of claim 12, wherein the memory controller is configured such that:
the shutdown preparation operation is executed in response to the shutdown signal, wherein the shutdown preparation operation includes stopping running of some processing units in a processor; and
a first processing unit of the processing units that continue to run in the memory controller output the response signal to the host in response to receiving the command.

14. The electronic apparatus of claim 13, wherein the memory controller includes a doorbell register, and the first processing unit is coupled to the doorbell register;
the host is configured to update the doorbell register in the memory controller while sending the command after the shutdown signal; and
the memory controller is configured such that the first processing unit outputs the response signal to the host in response to the doorbell register being updated.

15. The electronic apparatus of claim 14, wherein the host includes a completion queue, and
the memory controller is configured to:
write the response signal to the completion queue of the host; and
output an interrupt signal to the host, wherein the interrupt signal is configured to indicate to the host that the response signal is written to the completion queue; and
the host is configured to:
receive the interrupt signal; and
look up the response signal from the completion queue in response to the interrupt signal.

16. The electronic apparatus of claim 12, wherein
the host is configured to send different types of the shutdown signal; and
the memory controller is configured to output different response signals to the host in response to receiving the command, wherein the response signal is further configured to indicate a type of the shutdown signal.

17. The electronic apparatus of claim 16, wherein the memory system includes one or more subsystems, and each of the subsystems includes one or more memory controllers;
the shutdown signal includes a controller shutdown signal and a subsystem shutdown signal, wherein the controller shutdown signal is configured to control any one or more of the memory controllers to execute the shutdown preparation operation, and the subsystem shutdown signal is configured to control all the memory controllers in the subsystem to execute the shutdown preparation operation; and
the memory controller is configured to:
output a first response signal to the host in response to receiving the command, wherein the first response signal is configured to indicate that the memory controller has received the controller shutdown signal before receiving the command; or
output a second response signal to the host in response to receiving the command, wherein the second response signal is configured to indicate that the memory controller has received the subsystem shutdown signal before receiving the command.

18. An operation method of a memory controller, comprising:
executing a shutdown preparation operation in response to a shutdown signal, wherein the shutdown preparation operation includes stopping running of some processing units; and
outputting a response signal by a first processing unit that continues to run in the memory controller, in response to receiving a command after the shutdown preparation operation, wherein the response signal is configured to indicate that the memory controller has executed the shutdown preparation operation.

19. The operation method of claim 18, wherein the shutdown signal has different types, and the different types of the shutdown signal correspond to different types of the shutdown preparation operation, and wherein:
executing the shutdown preparation operation in response to the shutdown signal includes executing a corresponding shutdown preparation operation in response to the different types of the shutdown signal; and
outputting the response signal by the first processing unit of the processing units that continue to run in the memory controller in response to receiving the command includes outputting different response signals by the first processing unit in response to receiving the command, wherein the response signal is further configured to indicate a type of the executed shutdown preparation operation.

20. The operation method of claim 18, further including:

generating a parsing signal indicating a type of the shutdown signal in response to the shutdown signal; and generating the response signal by the first processing unit according to the parsing signal in response to receiving the command.

\* \* \* \* \*